S. G. MAJOR.
Cow-Milker.
No. 211,170.  Patented Jan. 7, 1879.
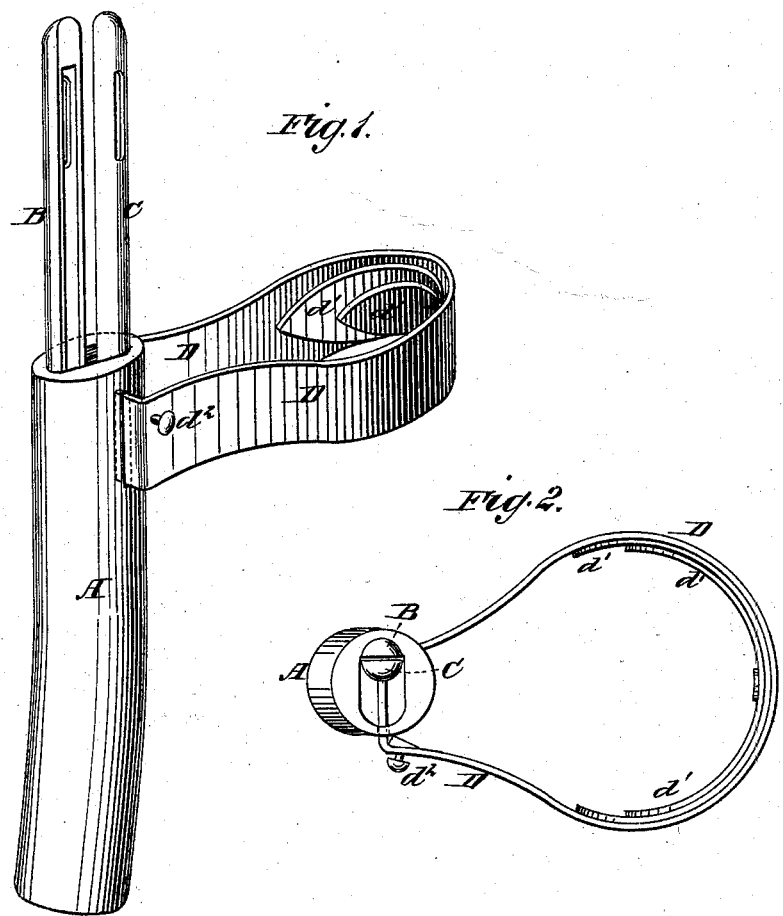
WITNESSES:
Francis McArdle
C. Sedgwick
INVENTOR:
S. G. Major
BY Munn &co
ATTORNEYS.

UNITED STATES PATENT OFFICE.

SLAUGHTER G. MAJOR, OF HAYNESVILLE, MISSOURI.

IMPROVEMENT IN COW-MILKERS.

Specification forming part of Letters Patent No. 211,170, dated January 7, 1879; application filed November 27, 1878.

*To all whom it may concern:*

Be it known that I, SLAUGHTER GABRIEL MAJOR, of Haynesville, in the county of Clinton and State of Missouri, have invented a new and useful Improvement in Cow-Milkers, of which the following is a specification:

Figure 1 is a perspective view of one of my improved cow-milkers. Fig. 2 is a top view of the same, the half-tubes being shown pressed together.

Similar letters of reference indicate corresponding parts.

The object of this invention is to furnish an improved device for use in milking cows, which shall be simple in construction, convenient in use, may be easily and quickly inserted in and removed from the teats, will not injure the teats in the least, and will direct the stream of milk into the pail.

The invention consists in an improved cow-milker formed of the tube, the slotted half-tubes, the one stationary and the other movable, having their upper ends rounded off upon their convex sides, and the bent or U spring, provided with a button near the upper edge of the end that carries the movable half-tube, as hereinafter fully described.

A is a short tube, to the inner surface of one side of the upper end of which is attached the rounded side of the lower end of the half-tube B. C is another half-tube, which is placed with its concave side directly opposite the concave side of the half-tube B.

The upper ends of the half-tubes B C have their cavities filled, and have their outer or convex sides rounded off, as shown in Figs. 1 and 2. The upper parts of the half-tubes B C are slotted longitudinally, as shown in Fig. 1.

The lower end of the half-tube C enters the upper end of the tube A, and is attached to the inwardly-bent end of a curved or U spring, D, which end passes through a slot in the side of the said tube A. The other end of the spring D is soldered or otherwise attached to the opposite side of the tube A.

The spring D may be stiffened at its bend by one or more leaves, $d^1$, if desired.

To the bent end of the spring D, near its upper edge, is attached a button or small knob, $d^2$, to be pressed upon with the thumb or finger to close the half-tubes B C, for inserting the said half-tubes into, and removing them from, the teats.

With this construction, the pressure being applied near the upper edge of the end of the spring D, the upper ends of the half-tubes B C will be closed first, and will be held close together, so that they may be more easily inserted. With this construction, when the half-tubes have been inserted in the teats and the pressure upon the button $d^2$ is removed, the said half-tubes will be drawn apart, and the milk will flow down between them and through the tube A into the pail or other vessel placed upon the ground or floor to receive it.

The tube A is slightly bent or curved, to counteract the outward inclination of the teats and direct the stream of milk into the pail.

Having thus described my invention, I claim as new and desire to secure by Letters Patent—

An improved cow-milker formed of the tube A, the slotted half-tubes B C, one stationary and the other movable, having their upper ends rounded off upon their convex sides, and the bent or U-spring D, provided with a button, $d^2$, near the upper edge of the end that carries the movable half-tube C, substantially as herein shown and described.

SLAUGHTER GABRIEL MAJOR.

Witnesses:
 GEO. W. MITCHELL,
 PETER B. McCRAREY.